US010283007B2

(12) United States Patent
Kurosawa et al.

(10) Patent No.: US 10,283,007 B2
(45) Date of Patent: May 7, 2019

(54) TRAINING SYSTEM AND METHOD FOR MOTORCYCLE RIDING

(71) Applicant: Honda Motor Co., Ltd., Minato-ku, Tokyo (JP)

(72) Inventors: Fuminobu Kurosawa, San Jose, CA (US); Daniel Behrendt, Atherton, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 326 days.

(21) Appl. No.: 14/676,057

(22) Filed: Apr. 1, 2015

(65) Prior Publication Data

US 2015/0364061 A1    Dec. 17, 2015

Related U.S. Application Data

(60) Provisional application No. 62/012,833, filed on Jun. 16, 2014.

(51) Int. Cl.
*G09B 9/058* (2006.01)
*G09B 9/052* (2006.01)

(52) U.S. Cl.
CPC ............. *G09B 9/058* (2013.01); *G09B 9/052* (2013.01)

(58) Field of Classification Search
CPC ........... G09B 9/058; G09B 9/052; G09B 9/42
See application file for complete search history.

(56) References Cited

U.S. PATENT DOCUMENTS

| 6,889,171 | B2 | 5/2005 | Skrbina et al. |
| 8,155,798 | B2 | 4/2012 | Seiniger et al. |
| 8,686,923 | B2 | 4/2014 | Eberl et al. |
| 2002/0198641 | A1 | 12/2002 | Halle |
| 2003/0191567 | A1 | 10/2003 | Gentilcore |
| 2004/0189722 | A1 | 9/2004 | Acres |
| 2005/0169001 | A1* | 8/2005 | Farrow .................. B60Q 1/124 362/476 |
| 2006/0143645 | A1* | 6/2006 | Vock ........................ A43B 3/00 725/9 |
| 2007/0086203 | A1* | 4/2007 | Nakano ................ B60Q 1/0023 362/514 |
| 2009/0024350 | A1 | 1/2009 | Suzuki et al. |
| 2010/0160014 | A1* | 6/2010 | Galasso ............. A63B 24/0021 463/6 |
| 2010/0302029 | A1 | 12/2010 | Emmerich et al. |
| 2012/0109418 | A1 | 5/2012 | Lorber |

(Continued)

FOREIGN PATENT DOCUMENTS

GB    2485804    5/2012

*Primary Examiner* — Samchuan C Yao
*Assistant Examiner* — Lily M Del Valle
(74) *Attorney, Agent, or Firm* — Arent Fox LLP

(57) ABSTRACT

A training system for a motorcycle has a plurality of sensor monitoring operating conditions of the motorcycle. A navigation system indicates a location and a route traveled by the motorcycle. A processor is coupled to the plurality of sensors and the navigation system. A memory is coupled to the processor. The memory stores program instructions that when executed by the processor, causes the processor to: analyze the operating conditions monitored by the plurality of sensors along the route; and provide feedback to increase a riding performance when re-riding the route.

20 Claims, 3 Drawing Sheets

(56) References Cited

U.S. PATENT DOCUMENTS

| | | | |
|---|---|---|---|
| 2013/0158687 A1* | 6/2013 | Willenborg | G06F 17/40 700/91 |
| 2013/0311075 A1 | 11/2013 | Tran et al. | |
| 2014/0195106 A1* | 7/2014 | McQuade | G07C 5/0841 701/33.9 |
| 2014/0257744 A1* | 9/2014 | Lokshin | A61B 5/1123 702/141 |
| 2014/0262581 A1* | 9/2014 | Whinnery | B62K 21/00 180/219 |
| 2015/0097863 A1* | 4/2015 | Alaniz | G06T 19/006 345/633 |
| 2015/0179066 A1* | 6/2015 | Rider | G08G 1/04 701/31.5 |
| 2015/0353151 A1* | 12/2015 | Klews | B62D 37/06 74/5.22 |
| 2016/0046297 A1* | 2/2016 | Kawakami | B60W 40/09 701/29.1 |
| 2016/0144915 A1* | 5/2016 | Bejestan | B62J 99/00 340/432 |

* cited by examiner

TRAINING SYSTEM AND METHOD FOR MOTORCYCLE RIDING

TECHNICAL FIELD

The present application generally relates to motorcycle riding, and, more particularly, to a system and method that uses real time data for generating feedback to assist a motorcycle rider in riding performance.

BACKGROUND

Many novice motorcyclists may not realize the skill it may take to ride a motorcycle. In general, the motorcyclist should try and maintain proper balanced in order to operate the motorcycle. This skill may be more apparent when trying to make a turn. Many novice motorcyclists may not know how to set a proper lean angle of the motorcycle and their body as they go around a corner. When the motorcycle goes around a curve, a centrifugal force may be generated horizontally. This force may be a function of the weight of the motorcycle and driver, the radius of the curve and the velocity of the motorcycle itself. If the motorcyclist takes the curve too fast, and/or at too step of an angle, the motorcyclists may fail to properly navigate the curve.

As with any skill, the more one practices and performs the activity, the more proficient one may become. Thus, the more one pays attention to one's technique and performance, the more proficient, the motorcyclist may become at operating the motorcycle. Motorcyclists that may want to become more advanced riders should pay attention to the roll angle or motorcycle tilt as they ride as well as other characteristics such as speed, terrain and similar operating conditions.

In the past, there may have been various devices that measure the lean angle of a motorcycle as it travels. Devices may have been used to measure the speed of the motorcycle, the lateral g-force of the motorcycle and acceleration of the motorcycle. However, in order to use the data gleaned from these various instruments, the motorcyclist may have to separately analyze the data from each measuring instrument and compare it to an ideal standard or some other standard that may prove useful to the motorcyclist. This may prove cumbersome to the motorcyclist and may prove difficult for any insight to be gained into the motorcyclist's performance. It may well prove to be too complex to make comparisons without another device to make meaningful comparisons.

Therefore, it would thus be desirable to provide a system and method that overcome the above problems by using real time data to generate feedback to assist a motorcycle rider in riding performance.

SUMMARY

In accordance with one embodiment, a training system for a motorcycle is disclosed. The training system has a plurality of sensors monitoring operating conditions of the motorcycle. A navigation system indicates a location and a route traveled by the motorcycle. A processor is coupled to the plurality of sensors and the navigation system. A memory is coupled to the processor. The memory stores program instructions that when executed by the processor, causes the processor to: analyze the operating conditions monitored by the plurality of sensors along the route; and provide feedback to increase a riding performance when re-riding the route.

In accordance with one embodiment, a training system for a motorcycle is disclosed. The training system has a plurality of sensors monitoring operating conditions of the motorcycle. A navigation system indicates a location and a route traveled by the motorcycle. A processor is coupled to the plurality of sensors and the navigation system. A memory is coupled to the processor. The memory stores program instructions that when executed by the processor, causes the processor to: analyze the operating conditions monitored by the plurality of sensors along the route; and provide feedback based on the operating conditions analyzed to increase a riding performance when re-riding the route, wherein the feedback is at least one of providing feedback to adjust at least one operating condition being monitored by the plurality of sensor or issue a warning prior to riding into a caution area on the route based on the operating conditions analyzed.

In accordance with one embodiment, a method to provide feedback for increasing a performance on a motorcycle is disclosed. The method comprises: monitoring operating conditions of a motorcycle by a plurality of sensors; indicating a location and a route traveled by the motorcycle by a navigation system; analyzing the operating conditions monitored by the plurality of sensors along the route; and providing feedback based on the operating conditions analyzed to increase a riding performance when re-riding the route, wherein the feedback is at least one of providing feedback to adjust at least one operating condition being monitored by the plurality of sensor or issue a warning prior to riding into a caution area on the route based on the operating conditions analyzed.

BRIEF DESCRIPTION OF DRAWINGS

The present application is further detailed with respect to the following drawings. These figures are not intended to limit the scope of the present application but rather illustrate certain attributes thereof.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Figure 1:
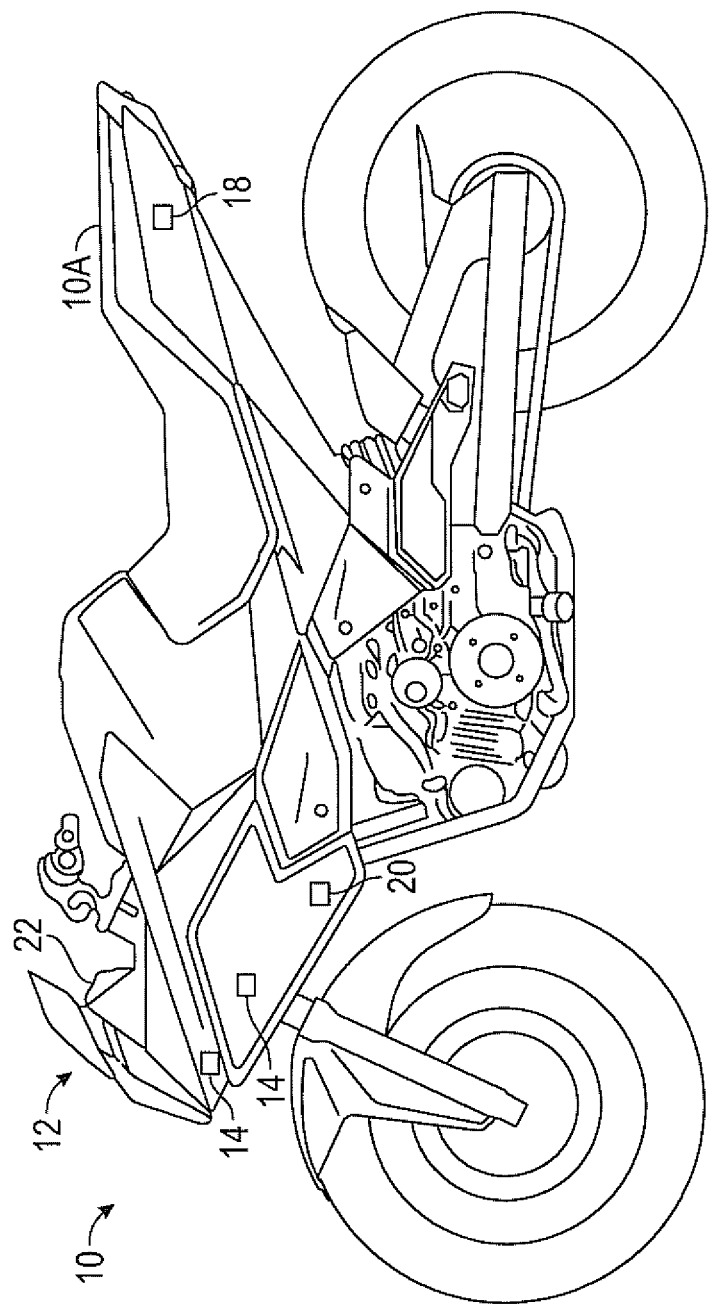
FIG. 1 is side view of a vehicle implementing an exemplary system for training a motorcyclist in accordance with one aspect of the present application.

Referring to FIG. 1, an exemplary vehicle 10 may be seen. In the present embodiment, the vehicle 10 may be a motorcycle 10A. The motorcycle 10A may be equipped with a system 12. The system 12 may be used to monitor and record real time data associated with riding conditions of the motorcycle 10A. The system 12 may use the real time data for creating feedback to assist a rider of the motorcycle 10A in riding performance.

Figure 2:
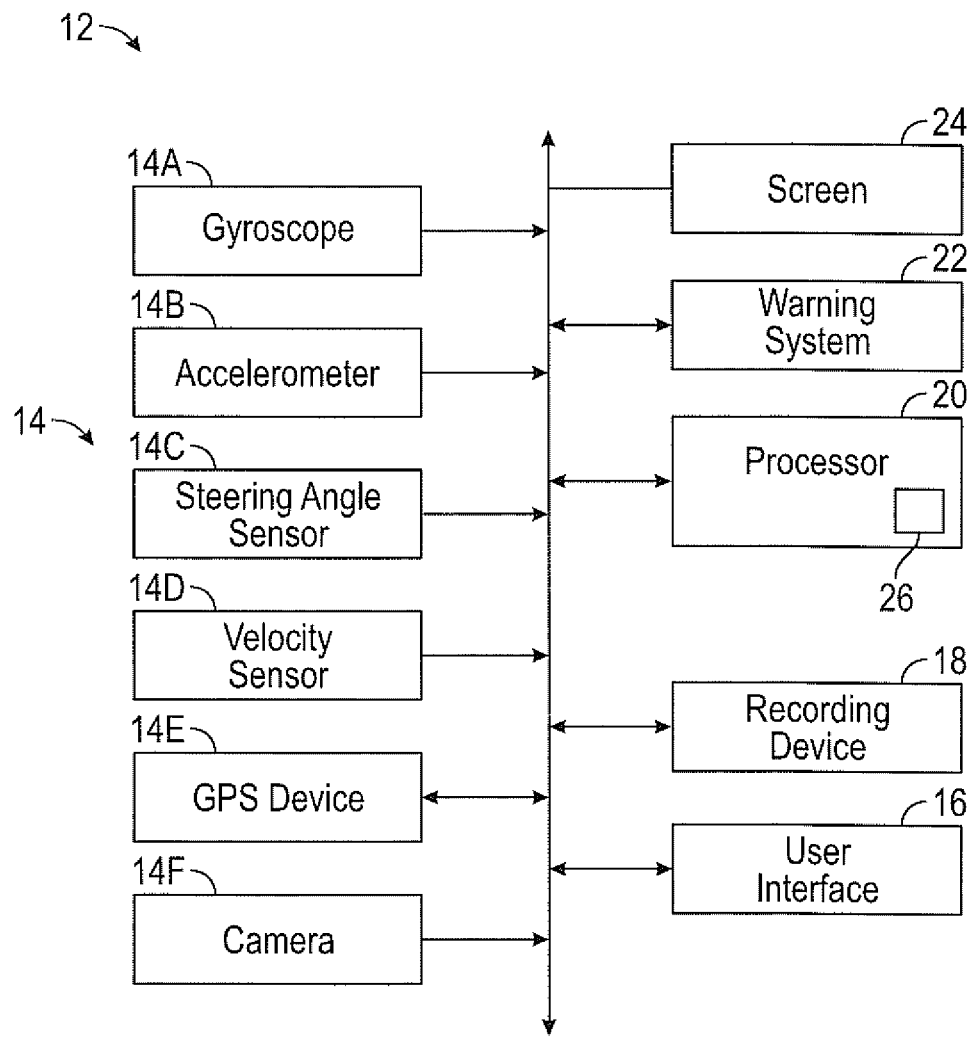
FIG. 2 is a block diagram of the exemplary system for training a motorcyclist depicted in FIG. 1 in accordance with one aspect of the present application.

Referring to FIGS. 1 and 2, the system 12 may have one or more devices 14 for monitoring data. The data monitored by the devices 14 may be data associated with riding conditions of the motorcycle 10A while the motorcycle 10A is being ridden. The devices 14 may be one or more gyroscopes 14A or similar devices to monitor a tilt angle of the motorcycle 10A and or body lean of the rider, an accelerometer 14B or similar device to monitor g-force acceleration, a steering angle sensor 14C or similar device to monitor a steering angle of the motorcycle 10A, a velocity sensor 14D or similar devices to monitor a speed of the motorcycle 10A, a Global Positioning Satellite device 14E or similar devices to indicate a location of the motorcycle 10A, a camera 14F or similar devices to record still pictures or videos, and other like devices that may be used to monitor different riding conditions of the motorcycle 10A while being ridden.

The system 12 may include a user interface 16. The user interface 16 may be used to enter information into and/or review data monitored by the system 12. The user interface 16 may be a separate user interface or may be a GPS interface forming part of the GPS device 14E. For example, the user interface 16 may be buttons, switches, keyboard, trackball, scroll wheel or similar device used to enter data. In accordance with one embodiment, a display unit 24, either a standalone unit or forming part of the GPS device 14E, may show an alphanumeric keyboard and the user interface 16 may be used to select and enter a desired letter and or number. Alternatively, the display unit 24 may be a touch screen display thereby functioning as a display unit 24 and the user interface 16.

The system 10 may have a recording device 18. The recording device 18 may be used to store data related to operation of the motorcycle 10A. The recording device 18 may be coupled to the devices 14. The data monitored by the devices 14 as the motorcycle 10A is being ridden may be sent to the recording device 18 for storage.

The system 12 may have a processor 20. The data monitored by the different devices 14 may be transmitted to the processor 20. The processor 20 may be used to analyze the data monitored by the different devices 14 and may provide feedback to the motorcyclist.

A "processor," as used herein, processes signals and performs general computing and arithmetic functions. Signals processed by the processor 20 can include digital signals, data signals, computer instructions, processor instructions, messages, a bit, a bit stream, or other means that can be received, transmitted and/or detected. Generally, the processor 20 can be a variety of various processors including multiple single and multicore processors and co-processors and other multiple single and multicore processor and co-processor architectures. The processor can include various modules to execute various functions The processor 20 may store a computer program or other programming instructions associated with a memory 26 to control the operation of the system 12 and to analyze the data received. The data structures and code within the software in which the present application may be implemented, may typically be stored on a non-transitory computer-readable storage. The storage may be any device or medium that may store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. The processor 20 may comprise various computing elements, such as integrated circuits, microcontrollers, microprocessors, programmable logic devices, etc., alone or in combination to perform the operations described herein.

The processor 20 may analyze the data monitored by the different devices 14 and may provide the motorcyclist with feedback during and/or after a ride. The feedback may include indicating how one or more of the riding criteria being monitored by the devices 14 may be adjusted to improve the riding performance.

For example, by analyzing the data, the processor 20 may deter mine if the motorcyclist drives more aggressively at one portion of a roadway by analyzing data from the devices 14 such as the tilt and or slant, velocity, etc of the motorcycle 10A. Warnings provided through a warning system 22 may be provided to the motorcyclist the next time the motorcyclist goes through the area as calculated by the GPS device 14E. The warning system 22 may include audible warnings, visual warnings or combinations of thereof. For example, the warning system 22 may display information on the display unit 24 or via warning lights. The display unit 24 may be part of the GPS device 14E or a separate display unit 24 unrelated to the GPS device 14E. Alternatively, the information may be audibly disclosed through a speaker system located on the motorcycle 10A. The above listing is given as an example and should not be seen in a limiting manner.

The processor 20 may be used to calculate a predefined performance level from the various parameters which may be measured during each run. During an initial run, the data monitored by the different devices 14 may be analyzed to determine how the motorcyclist may optimize the run by modifying the current readings. For example, a location of a route may be noted and marked using the GPS device 14E of the system 12. The system 12 may monitor and record the rider's body lean, steering angle and speed of the motorcycle 10A and other riding data throughout the route. The monitored data may be analyzed to compare the actual run to an ideal optimized run using the physical limitations of the roadway, the motorcycle 10A and/or the motorcyclist. When the motorcyclist makes another run through the same route and/or section of the roadway, the system 12 may alert and provide date to the motorcyclist which may aid in optimizing motorcyclist run. Thus, the system 12 may provide the motorcyclist with a calculated lean angle, steering angle, and speed, to aid in optimizing the run through the same route. The calculations may be based on the characteristics of the motorcyclist who performed the first run. The lean angle, steering angle, and speed, to aid in optimizing the run through the same route may vary depending on the characteristics of the motorcyclist. For example, a heaver motorcyclist may have a smaller lean and steering angle than that of a lighter weight motorcyclist in order to optimize a run. In accordance with one embodiment, the user interface 16 may be used to enter different motorcyclist characteristics to see how the different motorcyclist characteristics affect the run. The motorcyclist may enter how changes in the motorcyclist weight, dexterity, or other motorcyclist characteristics may change the performance of the run.

The system 12 may provide real time feedback. The motorcyclist may find a previous selected course using the GPS device 14E and make a subsequent pass through the same course. As the motorcyclist makes another run through the same course as determined by the GPS device 14E, the system 12 may supply the motorcyclist with real time feedback. Video and audio feedback during the subsequent course run may enable the rider to improve his time. For example, the system 12 may provide the motorcyclist visual and or audio cues at the precise moment required in order to improve the motorcyclist's performance. The system 12 may monitor a current reading and provide real time feedback to adjust a current reading to optimize the ride. For example, the system 12 may monitor a current lean angle of the motorcycle 10A. The system 12 may alert the motorcyclist to adjust the current lean angle to a calculated lean angle and speed to aid in optimizing the run.

At any time after the processor 20 has analyzed the date, the motorcyclist, or other individuals, may see the analyzed data. The analyzed data may be reviewed by using the user interface 16. When reviewing data monitored by the system 12, the data being reviewed may be displayed on the display unit 24. Alternatively, the data being reviewed may be audibly disclosed through a speaker system located on the motorcycle 10A. The above listing is given as an example as similar devices to those disclosed above may be used to review the data.

Figure 3:
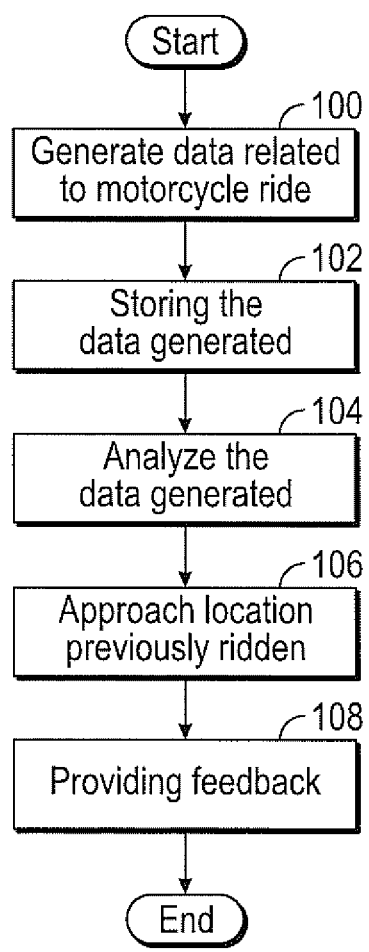
FIG. 3 is an exemplary flowchart depicting a method for training a motorcyclist using the exemplary system depicted in FIG. 1 in accordance with one aspect of the present application.

Referring now to FIGS. 1-3, an exemplary embodiment of a method of using the system 12 may be disclosed. In block 100, the system 12 may generate data. In order to create the data, a motorcyclist may ride through a particular section of a roadway, highway, track, trail, or similar route, defining a course. The system 12 may record different riding parameters through the devices 14. Once the data is generated, the data may be stored in the system 12 via a recording device 18 or other mechanism as shown in block 102.

The data may be analyzed as shown in block 104. As the motorcycle 10A is being ridden, the motorcycle 10A may approaches a location, as indicated by the GPS device 14E, that has been previously ridden through and has recorded data that has been analyzed as shown in block 106. The system 12 may provide feedback to the motorcyclist as shown in block 108. The feedback may include indicating how one or more of the riding criteria being monitored by the devices 14 may be adjusted to improve the riding performance.

While embodiments of the disclosure have been described in terms of various specific embodiments, those skilled in the art will recognize that the embodiments of the disclosure may be practiced with modifications within the spirit and scope of the claims.

The invention claimed is:

1. A training system for a motorcycle comprising:
a plurality of sensors monitoring operating conditions of the motorcycle, the plurality of sensors being coupled to the motorcycle and comprising at least one gyroscope, wherein the operating conditions monitored by the gyroscope comprise a tilt angle of the motorcycle and a body lean of a rider of the motorcycle;
a processor coupled to the plurality of sensors and a navigation system;
the navigation system indicating a location and a route traveled by the motorcycle and determining whether the location and the route has been previously ridden through by the motorcycle using the processor and a global positioning system (GPS);
and
a memory coupled to the processor, the memory storing program instructions that, when executed by the processor, cause the processor to:
analyze the operating conditions monitored by the plurality of sensors along the route by comparing the operating conditions monitored by the plurality of sensors along the route with an optimized run along the route using physical limitations of at least one of a roadway, the motorcycle, or the rider of the motorcycle; and
in response to the navigation system determining that the motorcycle is riding the previously ridden route, provide feedback to the rider of the motorcycle while the motorcycle is re-riding the route based on the comparison to increase a riding performance, wherein the feedback comprises instructions on how to adjust at least one of the operating conditions being monitored by the plurality of sensors.

2. The training system of claim 1, wherein the memory storing program instructions that when executed by the processor, causes the processor to issue a warning prior to riding into a caution area on the route based on the operating conditions.

3. The training system of claim 1, the memory storing program instructions that when executed by the processor, causes the processor to provide the feedback in real time.

4. The training system of claim 1, the memory storing program instructions that when executed by the processor, causes the processor to provide the feedback in at least one of an audible or visual mode.

5. The training system of claim 1, comprising a storage device recording the operating conditions monitored by the plurality of sensors and an associated position of the route where the operating conditions were monitored.

6. The training system of claim 1, comprising a user interface inputting information to review the operating conditions analyzed.

7. The training system of claim 1, comprising a display screen showing visual feedback of a run recorded by a camera and analyzed.

8. The training system of claim 1, wherein the plurality of sensors further comprises:
an accelerometer monitoring g-force acceleration;
a steering angle sensor monitoring a steering angle of the motorcycle; and
a velocity sensor monitoring a speed of the motorcycle.

9. The training system of claim 1, comprising a camera capturing visual data along the route.

10. A training system for a motorcycle comprising:
a plurality of sensors monitoring operating conditions of the motorcycle, the plurality of sensors being coupled to the motorcycle and comprising at least one gyroscope, wherein the operating conditions monitored by the gyroscope comprise a tilt angle of the motorcycle and a body lean of a rider of the motorcycle;
a processor coupled to the plurality of sensors and a navigation system;
the navigation system indicating a location and a route traveled by the motorcycle and determining whether the location and the route has been previously ridden through by the motorcycle using the processor and a global positioning system (GPS);
and
a memory coupled to the processor, the memory storing program instructions that when executed by the processor, causes the processor to:
analyze the operating conditions monitored by the plurality of sensors along the route by comparing the operating conditions monitored by the plurality of sensors along the route with an optimized run along the route using physical limitations of at least one of a roadway, the motorcycle, or the rider of the motorcycle; and in response to the navigation system determining that the motorcycle is riding the previously ridden route, provide feedback to the rider of the motorcycle while the motorcycle is re-riding the route to increase a riding performance re-riding the route, wherein the feedback comprises instructions on how to adjust at least one of the operating conditions being monitored by the plurality of sensors based on the comparison or a warning prior to riding into a caution area on the route based on the operating conditions.

11. The training system of claim 10, the memory storing program instructions that when executed by the processor, causes the processor to provide the feedback in real time.

12. The training system of claim 10, the memory storing program instructions that when executed by the processor, causes the processor to provide the feedback in at least one of an audible or visual mode.

13. The training system of claim 10, comprising a storage device recording the operating conditions monitored by the plurality of sensors and an associated position of the route where the operating conditions were monitored.

14. The training system of claim 10, comprising a user interface inputting information to review the operating conditions analyzed.

15. The training system of claim 10, wherein the plurality of sensors further comprises:
an accelerometer monitoring g-force acceleration;
a steering angle sensor monitoring a steering angle of the motorcycle; and
a velocity sensor monitoring a speed of the motorcycle.

16. The training system of claim 10, comprising a camera capturing visual data along the route.

17. A method to provide feedback for increasing a performance on a motorcycle comprising:

monitoring operating conditions of a motorcycle by a plurality of sensors, the plurality of sensors being coupled to the motorcycle and comprising at least one gyroscope, wherein the operating conditions monitored by the gyroscope comprise a tilt angle of the motorcycle and a body lean of a rider of the motorcycle;
indicating a location and a route traveled by the motorcycle by a navigation system;
determining whether the location and the route has been previously ridden through by the motorcycle using a processor and a global positioning system (GPS);
analyzing the operating conditions monitored by the plurality of sensors along the route by comparing the operating conditions monitored by the plurality of sensors along the route with an optimized run along the route using physical limitations of at least one of a roadway, the motorcycle, or the rider of the motorcycle; and
in response to determining that the motorcycle is riding the previously ridden route, providing feedback to the rider of the motorcycle while the motorcycle is re-riding the route to increase a riding performance, wherein the feedback comprises instructions on how to adjust at least one operating condition being monitored by the plurality of sensors based on the comparison or a warning prior to riding into a caution area on the route based on the operating conditions.

18. The method of claim 17, comprising providing the feedback in real time.

19. The method of claim 17, comprising providing the feedback in at least one of an audible or visual mode.

20. The training system of claim 1, wherein the instructions on how to adjust the at least one operating condition are based on a physical characteristic of the rider of the motorcycle.

* * * * *